United States Patent [19]

Schumacher et al.

[11] 3,896,856
[45] July 29, 1975

[54] DAMPED CONSUMER VALVE ARRANGEMENT
[75] Inventors: Werner Schumacher, Asperg; Eugen Mayr, Stuttgart, both of Germany
[73] Assignee: Robert Bosch G.m.b.H., Stuttgart, Germany
[22] Filed: Aug. 8, 1973
[21] Appl. No.: 386,738

[30] Foreign Application Priority Data
Sept. 11, 1972 Germany............................ 2244493

[52] U.S. Cl................................ 137/625.65; 251/54
[51] Int. Cl.²...................... F16K 31/02; F16K 11/00
[58] Field of Search..... 137/625.65, 625.69, 625.67; 251/325, 48, 51, 53, 54, 50

[56] References Cited
UNITED STATES PATENTS
| | | | |
|---|---|---|---|
| 772,115 | 10/1904 | Thompson | 251/54 |
| 984,874 | 2/1911 | Winton | 251/54 X |
| 2,621,676 | 12/1952 | Loft | 251/50 X |
| 2,916,019 | 12/1959 | Murphy | 137/625.65 |
| 3,200,847 | 8/1965 | Gillmore et al. | 137/625.65 |
| 3,701,366 | 10/1972 | Tirelli | 137/625.65 |

*Primary Examiner*—Martin P. Schwadron
*Assistant Examiner*—Robert J. Miller
*Attorney, Agent, or Firm*—Michael S. Striker

[57] ABSTRACT

The valve slide of a valve connects in a first position, a supply conduit with a first consumer conduit, while connecting a second consumer conduit with a return conduit through a return cylinder in which a spring-biased perforated damping piston, mechanically connected with the valve slide, forms a return chamber and a throttle chamber. Upon shifting of the valve slide in one direction to the first position, a pressure peak occurs in the return chamber, which urges the spring-biased damping piston in a damped movement in the opposite direction, opposing the movement of the valve slide so that the pressure peak is damped.

6 Claims, 2 Drawing Figures

DAMPED CONSUMER VALVE ARRANGEMENT

BACKGROUND OF THE INVENTION

The present invention relates to a damped consumer valve of the type in which the valve slide is electromagnetically operated, and which is provided with throttle means including a damping piston for slowing down the shifting movement of the valve slide.

A known valve of this type has a damping piston slidingly guided on a shifting rod of the valve slide. When the valve slide is shifted out of its neutral position to an operative position, the damping piston is pushed into a throttling chamber. The damping piston is biased by a spring, in addition to a return spring. The arrangement of the prior art is not only expensive to manufacture, but has also the disadvantage that, upon relief of a working chamber from pressure, forces act on the valve slide which accelerate its movement in the shifting direction. These forces are produced by the dynamic pressure in the return chamber when the pressure peak is reduced, and cause undesired noisy impacts.

SUMMARY OF THE INVENTION

It is one object of the invention to provide a damped valve of simple construction which overcomes the disadvantages of the prior art while carrying out all required functions.

The object of the invention is obtained by constructing a damping piston as a spring disc associated with a return device, while a shifting rod of the valve slide has a holding member which moves the damping piston when communication between the working chambe of the valve and the return chamber takes place.

In this manner, the result is obtained in a simple manner that the dynamic pressure developing in the return chamber, does not produce a temporarily accelerated shifting movement of the valve slide, which causes impacts. The dynamic pressure effects, through the damping piston which functions as a spring washer, a force opposing the valve slide movement, while acting only with a delay on the other side through the throttle, so that a slow valve slide movement is obtained. The use of the spring washer, which is required in any event, as a damping piston results in a particularly simple construction of the valve.

In a particularly simple embodiment of the invention, the damping piston and spring are arranged directly in the valve housing. Another simple construction using few parts is obtained when the return spring biasing the damping piston, directly abuts the housing, while the spring-biased damping piston abuts on its side opposite the return spring on the holding member of the valve slide and a shoulder of the housing, when the valve slide is in its neutral position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
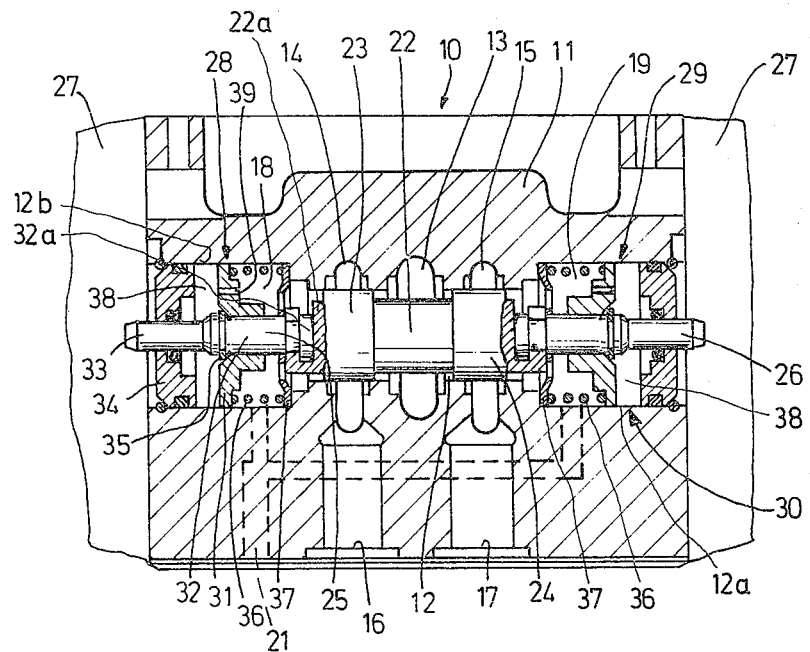
FIG. 1 is an axial sectional view illustrating a damped consumer valve in accordance with a first embodiment of the invention.

FIG. 1 illustrates a valve 10 whose housing 11 is provided with a bore 12 having several widened bore portions. An annular bore portion 13 receives pressure fluid through a pressure conduit, not shown, from a source of pressure, such as a pump. On opposite sides of the supply bore portion 13, two consumer bore portions 14 and 15 are arranged which are connected with consumer connections 16, 17 leading to first and second hydraulic consumer apparatus, not shown. Widened bore portions 12a and 12b at the ends of the bore 12 form cylinders including return chambers 18 and 19 connected with a return conduit 21 through which fluid is returned to the pump supplying the supply bore portion 13 with fluid.

Figure 2:
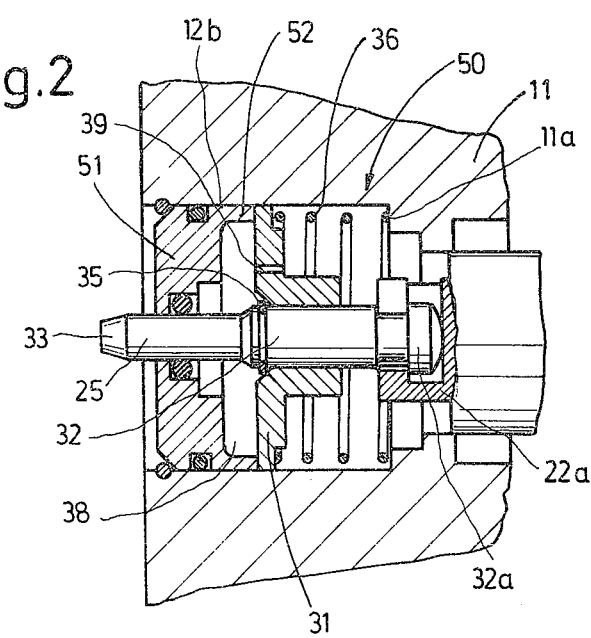
FIG. 2 is a fragmentary axial sectional view illustrating a second embodiment.

A valve slide 22 includes a main portion, and connecting rod portions 25, 26 each including two rod portions 33, 32 of different diameter connected by coupling head 32a with the coupling portion 22a of the valve slide 22, as best seen in FIG. 2. A holding means 35 is fixedly secured between the rod portions 32 and 33, and forms a flange on which the damping piston 31 abuts.

The valve slide 22 is movable in axial direction in the bore 12, and has a central neutral position in which the valve slide pistons 23, 24 disconnect the consumer bore portions 14, 15 from the supply bore portion 13, while closing the return bore portions 18 and 19. The valve slide 22 has first and second operative positions in which the consumer bore portions 14 and 15 are selectively connected with the supply bore portion 13, or with the return bore portions 18 and 19. The control rods 25 and 26 at the opposite ends of the valve slide 22 are connected with the armature of electromagnets 27 by which the valve slide can be shifted in opposite directions out of the neutral position.

In the region of the control rods 25, 26, each of which has two parts 32 and 33, throttling devices 28, 29, are identically constructed so that only the throttling device 28 will be described in greater detail. The throttling device 28 has a damping piston 31 which is also a spring washer for the return spring 36, which is guided on the large diameter portion 32 of the control rod 25 for sliding movement. The damping piston has at least one bore 39 therethrough, and is part of a mechanical return device 30. The smaller diameter portion 33 of the control rod 35 projects through a closure plug 34 into the electromagnet 27. The holding ring 35 on the portion 32 of the control rod 25, forms a stop or abutment for the spring-biased damping piston 31 which is urged by the return spring 36 against the holding ring or flange 35. The other end of the return spring 36 abuts another perforated spring washer 37, which abuts on shoulders of the valve body 11 and of the valve slide 22. The spring-biased damping piston 31 separates in the large diameter bore portion 12a and 12b of the valve body 11, the return chamber 18 from a throttling chamber 38 which are connected by the throttle bore 39 in the damping piston 31.

The valve shown in FIG. 1 operates as follows:

When the armature of electromagnet 27 pushes the valve slide 22 by the control rod 25 to the right, the valve slide piston 24 permits the flow of fluid from the supply bore portion 13 to the consumer bore portion 15. At the same, the valve slide piston 23 permits communication between the consumer bore portion 14 and the return chamber 18. When the pressure of the return flow is comparatively high, a dynamic pressure develops in the return chamber 18 when the pressure peak is reduced, and acts on the effective end face of the valve slide 22, tending to accelerate the valve slide toward the right since the pressure peak acts through the return conduit 21 only after a delay on the other end face of the valve slide 22.

The dynamic pressure acts on the same time on the damping piston 31 which exerts on holding ring 35 a force delaying the shifting movement of the valve slide to the right. The dynamic pressure of the fluid in the return chamber 18, can develop in the throttling chamber only with a delay caused by the throttle bore 39. In this manner, the forces which accelerate the shifting movement of the valve slide due to the short dynamic pressure rise in the return chamber 19, are substantially compensated so that undesired hard shifting impacts are avoided. The throttling arrangement 28 operates particularly effectively, since the pressure peak can act directly on the spring-biased damping piston 31, and does not require a limited stroke of the valve slide 22 for the building up of the respective pressure in the throttling chamber by the action of a damping piston.

The effect of the throttling device 28 during a movement of the valve slide 22 to the right, is aided by an additional effect of the throttling device 29, although in a substantially lower degree than is obtained by the throttling device 28. In the throttling device 29, the valve slide 22 presses the damping piston 31 to the right through the spring washer 37 and the return spring 36. Pressure fluid must escape from the throttle chamber 38 through the throttle bore 39 into the return chamber 19, which results in an additional damping effect on the movement of the valve slide 22.

When the valve slide 22 is shifted to the left, to supply fluid to the other consumer conduit, the throttling devices 28, 29 operate in a corresponding reverse manner.

FIG. 2 illustrates a portion of a modified embodiment of the invention, which is generally constructed in the same manner as the embodiment in FIG. 1, with the exception of the omission of the spring washer 37. The return spring 36 directly abuts the shoulder 11a of the valve body. A plug 51 closes the cylinder 12b and is positioned so that the damping piston 31 abuts an annular abutment 52 of the plug 51, and simultaneously abuts with its hub on the holding ring 35 which is secured to the control rod 25. The function of the throttling device 50 during movement of the valve slide 22 to the right corresponds to the function of the throttling device 28. An additional damping of the valve slide 22 corresponding to the effect of the throttling device 29, is obtained during a movement of the valve slide 22 to the right since the rod portion 32 of the control 25 displaces fluid through the throttle bore 39 when moving into the throttle chamber 38, while the damping piston 31 is urged by the force of the return spring 36 toward the annular abutment 52.

From the above it becomes apparent that the amount of damping can be influenced by the selection of the effective surfaces of the valve slide 22 and of the damping piston 31, by the selection of the diameter of the throttle bore 39, or by play of the damping piston, and the ratio of the diameters of the portions 32, 33 of the control rods 25, 26. Instead of electromagnets, hydraulic, pneumatic or mechanical devices can be used for shifting the valve slide between the operative positions.

The arrangement according to FIG. 1 can not only be used for a valve slide which closes all conduits in the neutral position, but with great advantage with a valve slide which connects all chambers 13, 14, 15, 18 and 19 in a neutral position with one another. In such an arrangement, extremely high pressure peaks occur when, for example, the valve slide moves from its left end position toward the central neutral position so that the consumer chamber 14, which was first connected with the supply chamber 13, is now relieved into the return chamber 18.

It will be understood that each of the elements described above, or two or more together, may also find a useful application in other types of valve arrangements differing from the type described above.

While the invention has been illustrated and described as embodied in a damped consumer valve arrangement including a spring-biased damping piston, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Damped consumer valve arrangement comprising a valve body having a bore and including supply conduit means, consumer conduit means, and return conduit means communicating with a supply bore portion, first and second consumer bore portions, and first and second return bore portions of said bore, respectively; valve means movable in said bore between a neutral position, and first and second operative positions for connecting in said first operative position said supply bore portion with said first consumer bore portion and said second consumer bore portion with said second return bore portion and for connecting in said second operative position said supply bore portion with said second consumer bore portion and said first consumer bore portion with said first return bore portion; damping means arranged in at least one of said return bore portions and including spring means, a damping piston movably mounted on said valve slide means and engaging one end of said spring means, and an annular spring washer also movably mounted on said valve slide means and engaging the other end of said spring means; first stationary abutment means on one end of said at least one return bore portion, and second stationary abutment means on the opposite end of said at least one return bore portion, said damping piston being spaced from said first abutment means and said spring washer engaging said second abutment means in said neutral position of said valve slide means; and a pair of engaging means on said valve slide means, one of said engaging means engaging said damping piston during movement of said valve slide means in one direction from said neutral position, while said spring washer remains in abutment with said second abutment means and moves relative to the other of said pair of engaging means, and the other engaging means engaging said spring washer during movement of said valve slide means in the opposite direction from said neutral position, while said damping piston moves relative to said one engaging means to engage said first abutment means.

2. Damped consumer valve arrangement as claimed in claim 1, said damping piston having a throttling opening therethrough and forming in said at least one return bore portion a return chamber and a throttling chamber communicating with said return chamber through said throttle opening.

3. Damped consumer valve arrangement as claimed in claim 2 wherein said return chamber and said throttling chamber form a cylinder in said valve body; and wherein said damping piston is guided in said cylinder.

4. Damped consumer valve arrangement as claimed in claim 2 wherein said valve slide means includes control rod means passing through said throttling chamber and said return chamber and having in said return chamber a greater diameter than in said throttling chamber.

5. Damped consumer valve arrangement as claimed in claim 1 comprising electromagnetic means for moving said valve slide means between said operative positions.

6. Damped consumer valve arrangement as claimed in claim 1, wherein said damping means comprise first and second damping means respectively arranged in said first and second return bore portions.

* * * * *